(12) United States Patent
Yasumura

(10) Patent No.: US 6,370,043 B1
(45) Date of Patent: *Apr. 9, 2002

(54) SWITCHING POWER SUPPLY CIRCUIT FORMED AS A COMPOSITE RESONANCE CONVERTER

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,548
(22) PCT Filed: May 10, 2000
(86) PCT No.: PCT/JP00/02994
  § 371 Date: Jan. 10, 2001
  § 102(e) Date: Jan. 10, 2001
(87) PCT Pub. No.: WO00/69059
  PCT Pub. Date: Nov. 16, 2000

(30) Foreign Application Priority Data

May 11, 1999 (JP) .......................... 11-129725

(51) Int. Cl.[7] ............................ H02M 3/335
(52) U.S. Cl. ...................... 363/21.02; 363/21.03
(58) Field of Search ............... 363/21.02, 21.03

(56) References Cited

U.S. PATENT DOCUMENTS

| | | | | |
|---|---|---|---|---|
| 4,559,590 A | * | 12/1985 | Davidson | 363/21 |
| 4,628,426 A | | 12/1986 | Steigerwald | 363/17 |
| 4,785,387 A | * | 11/1988 | Lee et al. | 363/21 |
| 5,216,585 A | * | 6/1993 | Yasumura | 363/19 |
| 5,315,496 A | * | 5/1994 | Okochi et al. | 363/21 |
| 5,396,410 A | * | 3/1995 | Okochi et al. | 363/21 |
| 5,495,405 A | * | 2/1996 | Fujimura et al. | 363/20 |
| 5,608,613 A | * | 3/1997 | Jansen | 363/21 |
| 5,706,184 A | * | 1/1998 | Mizuta et al. | 363/21 |
| 5,783,984 A | | 7/1998 | Keuneke | 336/155 |
| 5,877,946 A | * | 3/1999 | Fitzgerald | 363/21 |
| 5,991,170 A | * | 11/1999 | Nagai et al. | 363/20 |
| 5,991,171 A | * | 11/1999 | Cheng | 363/21 |

OTHER PUBLICATIONS

Patent Abstracts of Japan, vol. 1996, No. 07, Mar. 8, 1996, JP 08 066026.
Laouamer et al: "A Multi–Resonant Converter for Non–Contact Charging With Electromagnetic Coupling" New Orleans, Nov. 9–14, 1997, New York, IEEE Service Center, US, 1997, pp. 792–797, XP002145223.

* cited by examiner

Primary Examiner—Jeffrey Sterrett
(74) Attorney, Agent, or Firm—Frommer Lawrence & Haug LLP; William S. Frommer; Dennis M. Smid

(57) ABSTRACT

A switching power supply circuit of the resonance type which can handle high load power and has high power conversion efficiency, small size and light weight is provided. The switching power supply circuit may be formed as a composite resonance converter wherein a voltage resonance converter is provided on a primary side and a parallel resonance circuit is provided on a secondary side. The switching power supply circuit may include an insulating converter transformer having a pair of E-shaped cores each with outer and center legs in which a gap is formed between the middle legs thereof so that a loose coupling condition having a coupling coefficient higher than a predetermined level may be obtained. A half-wave rectifier circuit of an additive mode may be provided on the secondary side. A switching frequency of a switching element for switching a dc input voltage to the insulating converter transformer on and off may be varied to effect constant voltage control.

7 Claims, 12 Drawing Sheets

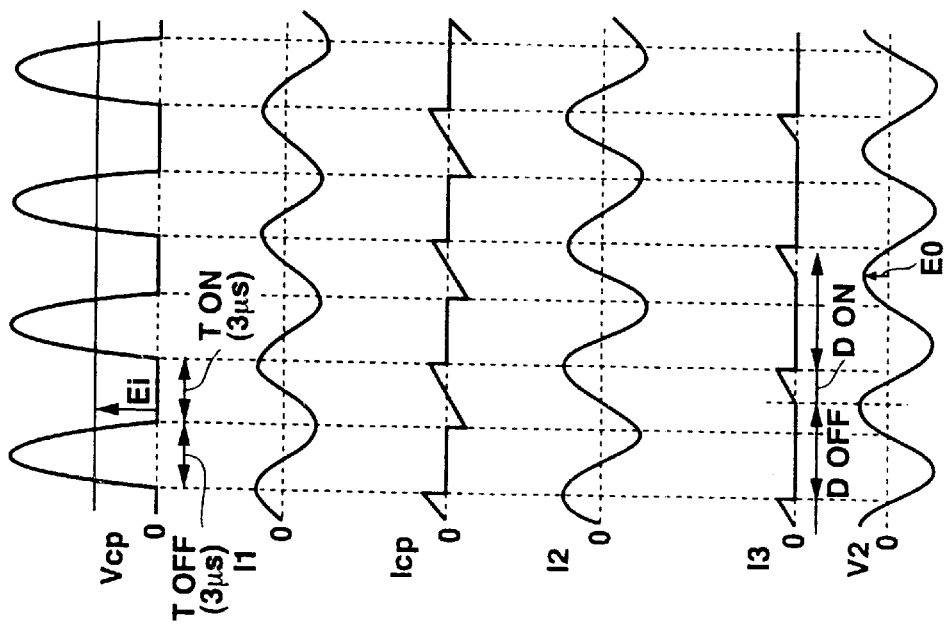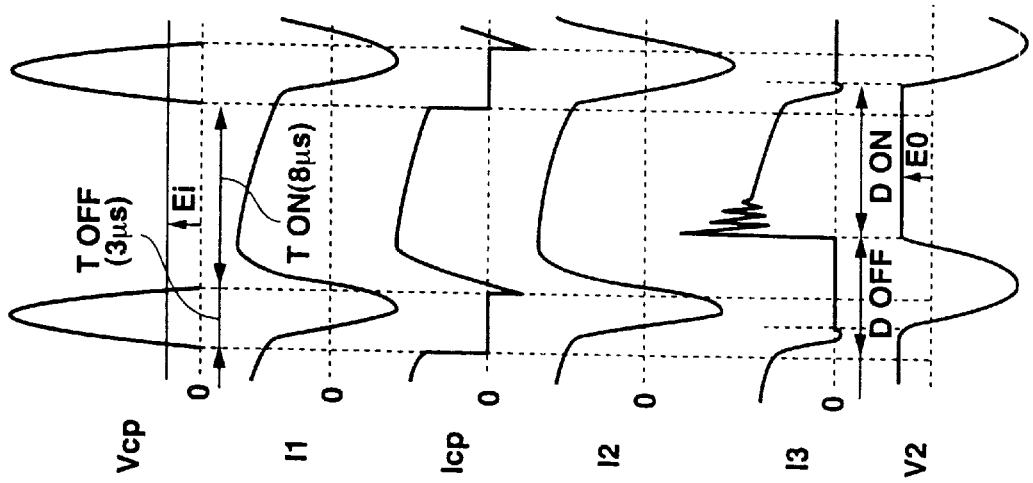

FIG.10A Vcp

FIG.10B V2

FIG.15A Vcr
(RELATED ART)
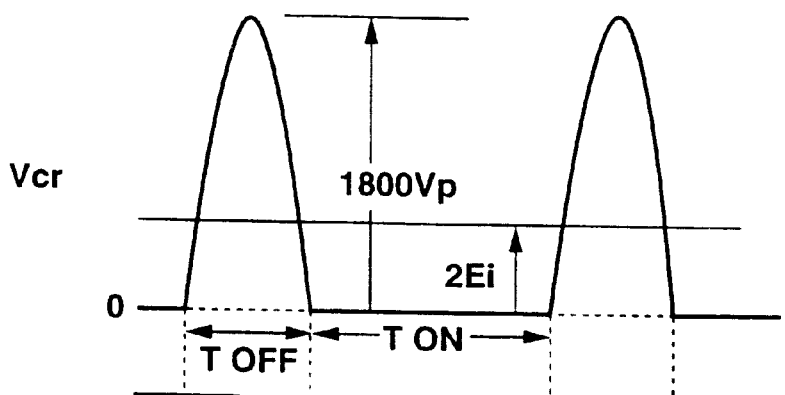
FIG.15B V2
(RELATED ART)
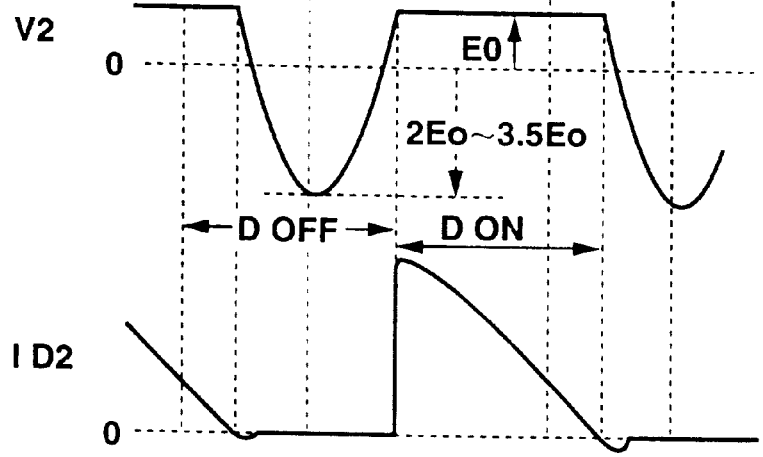
FIG.15C ID2
(RELATED ART)

SWITCHING POWER SUPPLY CIRCUIT FORMED AS A COMPOSITE RESONANCE CONVERTER

BACKGROUND OF THE INVENTION

The present invention relates to a switching power supply circuit which may be used as a power supply for electronic apparatus.

A switching power supply circuit which includes a switching converter of a voltage resonance type is a soft switching power supply circuit. In such circuit, a switching output pulse voltage and switching output current produced by the switching converter and supplied to an insulating converter transformer may have smooth waveforms. As a result, the switching converter may generate relatively low noise. Furthermore, such switching converter may be formed from a relatively small number of parts.

FIG. 11 illustrates a switching power supply circuit of the voltage resonance type. Such switching power supply circuit is operable with a commercial ac power supply AC of 100 V which may be available in Japan or the United States and is usable with a maximum load power of 150 W or more.

The switching power supply circuit shown in FIG. 11 includes a rectifier smoothing circuit for rectifying and smoothing the commercial ac power supply AC. The rectifier smoothing circuit is formed as a voltage multiplying rectifier circuit composed of a pair of rectifier diodes Di1 and Di2 and a pair of smoothing capacitors Ci1 and Ci2. The voltage multiplying rectifier circuit may produce a dc input voltage equal to approximately twice a dc input voltage Ei which is equal to a peak value of the ac input voltage VAC. For example, if the ac input voltage VAC is 144 V, then the dc input voltage 2Ei is approximately 400 V The voltage multiplying rectifier circuit is adopted as the rectifier smoothing circuit so as to enable a relatively heavy load from the ac input voltage of 100 V and the maximum load power of 150 W or more. In other words, the dc input voltage is set to twice the normal voltage to suppress the amount of inflow current to a switching converter in the next stage so as to improve the reliability of the components of the switching power supply circuit.

An inrush current limiting resistor Ri is inserted in a rectifier current path of the voltage multiplying rectifier circuit shown in FIG. 11. As a result, inrush current which may flow into the smoothin capacitors during the initial supply of power may be suppressed.

The switching power supply circuit of FIG. 11 may include a switching converter of the voltage resonance type having a self-excited construction and including a single switching element Q1. Such switching element may be a high voltage withstanding bipolar transistor (BJT: junction transistor). The collector of the switching element Q1 is connected to an end of a primary winding N1 of an insulating converter power isolation transformer (PIT), and the emitter of the switching element Q1 is grounded. The base of the switching element Q1 is coupled to the positive electrode side of the smoothing capacitor Ci2 (rectified smoothed voltage Ei) through a starting resistor RS. As a result, during a starting operation, the current supplied to the base of the switching element Q1 may be rectified and smoothed. Further, a resonance circuit for self-excited oscillation is connected between the base of the switching element Q1 and the primary side ground and is formed from a series connection of an inductor LB, a resonance capacitor CB, a detection driving winding NB, and a damping resistor RB. The detection driving winding NB is wound on the insulating converter PIT and together with the inductor LB provides the inductance for setting a switching frequency.

A clamp diode DD is arranged between the base of the switching element Q1 and the primary side ground and forms a path for damper current which flows when the switching element Q1 is off.

A resonance capacitor Cr is connected in parallel between the collector and the emitter of the switching element Q1. Based on the capacitance of the resonance capacitor Cr and a combined inductance (L1 and LR) obtained from a series connection of the primary winding N1 of the insulating converter transformer PIT and a controlled winding NR of an orthogonal control power regulating transformer (PRT), the resonance capacitor Cr forms a resonance circuit of a voltage resonance type converter. When the switching element Q1 is off, a voltage resonance type operation may be obtained by the resonance circuit which causes the voltage Vcr across the resonance capacitor Cr to exhibit a pulse wave of a sine waveform.

One end of the primary winding N1 of the PIT is connected to the collector of the switching element Q1, and the other end of the primary winding N1 is connected to the controlled winding NR of the PRT.

The PIT transmits a switching output of the switching element Q1 to the secondary side.

On the secondary side of the insulating converter transformer PIT, an alternating voltage induced by the primary winding N1 appears in the secondary winding N2. A secondary side parallel resonance capacitor C2 is connected in parallel to the secondary winding N2 so as to form a parallel resonance circuit. The alternating voltage induced in the secondary winding N2 is converted into a resonance voltage by the parallel resonance circuit. Such resonance voltage is supplied to two half-wave rectifier circuits in which one such half-wave rectifier circuit includes a rectifier diode D01 and a smoothing capacitor C01 and the other half-wave rectifier circuit includes a rectifier diode D02 and a smoothing capacitor C02. The two half-wave rectifier circuits produce two different dc output voltages E01 and E02. The rectifier diodes D01 and D02 may be high-speed type rectifier diodes so as to rectify the alternating voltage of a switching period.

The control circuit 1 is an error amplifier which may compare a dc output voltage of the secondary side with a reference voltage and supply a dc current corresponding to an error therebetween as a control current to the control winding NC of the orthogonal control transformer PRT. Here, the dc output voltage E01 and the dc output voltage E02 may be supplied to the control circuit 1 as a detection voltage and as an operation power supply, respectively.

As an example, if the dc output voltage E02 of the secondary side varies in response to a variation of the ac input voltage VAC or the load power, then the control current which is to flow through the control winding NC may be varied within the range of 10 mA to 40 mA by the control circuit 1. As a result, the inductance LR of the controlled winding NR may vary within the range of 0.1 mH to 0.6 mH.

Since the controlled winding NR forms a resonance circuit which may perform a voltage resonance type switching operation as previously described, the resonance condition of the resonance circuit may vary with respect to the switching frequency which is fixed. Across the parallel circuit of the switching element Q1 and the resonance capacitor Cr, a resonance pulse of a sine waveform may appear due to the resonance circuit corresponding to an off period of the switching element Q1 and the width of the resonance pulse may be variably controlled by the variation of the resonance condition of the parallel resonance circuit. As such, a pulse width modulation (PWM) control operation for a resonance pulse may be obtained. The PWM control of the resonance pulse width may occur during the off period of the switching element Q1 and, as a result, the on period of the switching element Q1 is variably controlled in the condition wherein the switching frequency is fixed. Since the on period of the switching element Q1 is variably controlled in this manner, the switching output transmitted from the primary winding N1 (which forms the parallel resonance circuit to the secondary side) varies, and the level or levels of the dc output voltages E01 and E02 of the secondary side vary. Consequently, the secondary side dc output voltage E01 or E02 is controlled to a constant voltage. Such constant voltage control method is hereinafter referred to as an inductance control method.

FIG. 12 illustrates another switching power supply circuit of the voltage resonance type. Elements in FIG. 12 similar to those in FIG. 11 are denoted by the same reference characters and, in the interest of brevity, a further description thereof is omitted herein.

In the power supply circuit of FIG. 12, a controlled winding of an orthogonal control transformer PRT is provided on the secondary side. Such controlled winding of the orthogonal control transformer PRT may include two controlled windings NR and NR1. The controlled winding NR is arranged in series between an end of the secondary winding N2 and the anode of the rectifier diode D01. The controlled winding NR1 is arranged in series between a tap output of the secondary winding N2 and the anode of the rectifier diode D02. In such configuration, a parallel resonance circuit of the secondary side is formed which includes inductance components of the controlled windings NR and NR1.

In the arrangement of FIG. 12 wherein the controlled windings (NR and NR1) of the orthogonal control transformer PRT are provided on the secondary side, the orthogonal control transformer PRT operates such that, as the inductance of the controlled winding NR is varied in accordance with an inductance control method, the pulse width of a resonance voltage V2 of the secondary side parallel resonance capacitor C2, that is, the continuity angle of the secondary side rectifier diodes, is variably controlled. Such control of the output level on the secondary side enables constant voltage control to be achieved.

The insulating converter transformer PIT provided in the power supply circuits of FIGS. 11 and 12 is illustrated in FIG. 13. As shown therein, the insulating converter transformer PIT includes an EE-shaped core having a pair of E-shaped cores CR1 and CR2 which may be made of a ferrite material. These E-shaped cores may be combined to each other such that magnetic legs thereof are opposed to each other and such that a gap is not provided between the middle magnetic legs. The primary winding N1 and the secondary winding N2 are wound separately from each other on the central magnetic legs of the EE-shaped core using a bobbin B. As a result, a loose coupling (for example, a coupling coefficient k may have a value of approximately 0.9) may be obtained between the primary winding N1 and the secondary winding N2.

In the insulating converter transformer PIT, a mutual inductance M between inductance L1 of the primary winding N1 and inductance L2 of the secondary winding N2 may have a value +M (additive mode) or a value −M (subtractive mode) depending upon the relationship between the polarities (winding directions) of the primary winding N1 and the secondary winding N2 and the connection of the rectifier diodes D01 and D02. For example, if such components have a configuration as shown in FIG. 14A, then the mutual inductance is +M; however, if such components have a configuration as shown in FIG. 14B, then the mutual inductance is −M.

FIGS. 15A to 15C illustrate operation waveforms in a switching period of the power supply circuit of FIG. 11. In these figures, reference characters TON and TOFF denote periods wherein the switching element Q1 is on and off, respectively, and reference characters DON and DOFF denote periods wherein the rectifier diode D01 on the secondary side is on and off, respectively.

The resonance voltage Vcr across the switching element Q1 and resonance capacitor Cr has a waveform similar to a pulse of a sine waveform within a period TOFF (as shown in FIG. 15A) wherein the switching element Q1 is off and the operation of the switching converter is a voltage resonance type operation. The peak level of the pulse of the resonance voltage Vcr is approximately 1,800 V which is due to the impedance of the resonance circuit of the primary side of the voltage resonance converter acting upon the dc input voltage of 2Ei obtained by the voltage multiplying rectification.

With regard to the operation of the secondary side, the rectifier diode D01 operates such that rectified current flows within a period DON which is approximately equal to the period TON of the switching element Q1 as shown in FIG. 15C. This operation is based on the +M (additive mode) mutual inductance described above with reference to FIG. 14. A substantially similar operation timing is also obtained with regard to the rectifier diode D02.

As a result of the above described rectification operation, the resonance voltage V2 across the secondary side parallel resonance capacitor C2 becomes a sine waveform having a peak level equal to twice to 3.5 times the dc output voltage E0 (E01 or E02) within the period DOFF wherein the rectifier diode D01 is off, and a voltage level equal to the dc output voltage E0 (E01 or E02) within the period DON wherein the rectifier diode D01 is on, as shown in FIG. 15B.

In the voltage resonance converters described above with reference to FIGS. 11 to 15C, a dc input voltage having a level of 2Ei is obtained using the voltage multiplying rectification system so as to satisfy the condition of an ac input voltage VAC of AC 100 V and a maximum load power of 150 W or more. Therefore, as described hereinabove with reference to FIG. 15A, the resonance voltage Vcr of 1,800 V appears across the switching element Q1 and the parallel resonance capacitor Cr when the switching element Q1 is off.

Therefore, the switching element Q1 and the resonance capacitor Cr should be able to withstand a high voltage. As a result, the switching element Q1 and the resonance capacitor Cr have relatively large sizes. Furthermore, and particularly when a high withstanding voltage switching element Q1 is used, since such element is relatively high in saturation voltage VCE (SAT) and long in storage time tSTG and fall time tf and is relatively low in current amplification factor hFE, it may be difficult to set the switching frequency to a relatively high value. A low value or a decrease of the switching frequency may increase the switching loss and the drive power which may increase the power loss of the power supply circuit.

Further, in the power supply circuits shown in FIGS. 11 and 12, the controlled winding NR of the orthogonal control transformer PRT is connected in series to one of the primary winding N1 and the secondary winding N2. Such arrangement may increase a leakage inductance component of the insulating converter transformer PIT.

As a countermeasure, the entire power supply circuit may be arranged in an aluminum shield case having vent holes formed therein and a connector for connecting input and output lines may be mounted on a circuit board. However, such countermeasure may increase the size and weight of the power supply circuit and may increase the complexity of the fabrication thereof.

OBJECTS AND SUMMARY OF THE INVENTION

It is an object of the present invention to provide a switching power supply circuit which can handle a relatively high power load, has a relatively high power conversion efficiency, and has a relatively small size and light weight.

According to an aspect of the present invention, a switching power supply circuit is provided which comprises a rectifier smoothing circuit for receiving an ac power supply, producing a rectified smoothed voltage having a level equal to that of the ac power supply and outputting the rectified smoothed voltage as a dc input voltage; an insulating converter transformer for transmitting a primary side output to a secondary side, in which the insulating converter transformer has a gap formed therein so that a coupling efficient (k) for a loose coupling is obtained; a switching circuit including a switching element for switching the dc input voltage on and off so as to be outputted to a primary winding of the insulating converter transformer; a primary side resonance circuit formed from a leakage inductance component from the primary winding of the insulating converter transformer and a capacitance of a resonance capacitor to enable the switching circuit to operate as a voltage resonance type; a secondary side parallel resonance circuit including a secondary winding of the insulating converter transformer and a secondary side parallel resonance capacitor connected such that a parallel resonance circuit is formed from a leakage inductance component of the secondary winding of the insulating converter transformer and a capacitance of the secondary side parallel resonance capacitor; a dc output voltage production circuit for receiving an alternating voltage obtained at the secondary winding of the insulating converter transformer and performing a half-wave rectification operation by an additive mode for the alternating voltage to produce a secondary side dc output voltage; and a constant voltage control circuit for varying a switching frequency of the switching element in response to a level of the secondary side dc output voltage to perform constant voltage control of the secondary side output voltage.

In the present switching power supply circuit, the insulating converter transformer has a loose coupling, and the resonance circuit for forming a voltage resonance converter on the primary side and the parallel resonance circuit on the secondary side form a composite resonance converter. Further, the constant voltage control is performed by controlling the switching frequency of the switching element which forms the voltage resonance converter of the primary side. The switching power circuit can thus operate to vary the switching frequency within a high frequency range.

Instead of a voltage multiplying rectifier circuit, the present switching power supply circuit may, on the primary side, include a full-wave rectifier circuit for producing a rectified smoothed voltage equal to the level of the ac input voltage thereto.

Therefore, the present switching power supply circuit may include a composite resonance converter wherein a voltage resonance converter is provided on the primary side and a parallel resonance circuit is provided on the secondary side, and a gap is formed in a middle magnetic leg of an insulating converter transformer so that the insulating converter transformer may have a loose coupling condition and a coupling coefficient higher than a predetermined value and a half-wave rectifier circuit of an additive mode is provided on the secondary side. The switching frequency is varied to perform constant voltage control.

In the present switching power supply circuit, constant voltage control may be performed by switching frequency control. Further, the switching frequency may be set to a relatively high level as compared to other circuits wherein inductance control of the insulating converter transformer is performed while the switching frequency is fixed or the width of a voltage resonance pulse is variably controlled.

When the switching frequency is set to a relatively high level, power loss by switching decreases and, as a result, an increase in power conversion efficiency over a wide range of load conditions can be achieved.

Further, since the parallel resonance circuit on the secondary side operates with constant voltage control, the range of the constant voltage control may be expanded.

During an operation of the switching power supply circuit when the load is relatively heavy, the switching frequency of the switching element may be controlled so as to increase the on period of the switching element. Since relatively high levels of primary side resonance current and secondary side resonance current may be supplied during the period, the switching power supply circuit can handle the heavy load condition. As a result, an increase in the maximum load power can be achieved with the present switching power supply circuit. Accordingly, the present switching power supply circuit may be applied to an apparatus which exhibits a large fluctuation in the load.

Since the switching power supply circuit can increase the maximum load power, it can sufficiently handle the condition described above even if it is constructed such that instead of a voltage multiplying rectifier circuit an ordinary full-wave rectifier circuit is employed on the primary side so that a rectified smoothed voltage corresponding to the ac input voltage level may be inputted.

For a conventional switching power supply circuit to handle the condition described above, it uses a voltage multiplying rectifier circuit to produce a rectified smoothed voltage equal to twice the ac input voltage level. Therefore, in such circuit, the switching element or the resonance capacitor on the primary side should have a voltage withstanding property against a switching voltage generated in response to the rectified smoothed voltage level.

On the other hand, with regard to the present switching power supply circuit, since the primary side resonance voltage which depends upon a rectified smoothed voltage level is much lower than that of the conventional switching power supply circuit as a result of the equal voltage rectifier circuit and the ability to raise the switching frequency to a high level, the switching element or the primary side resonance capacitor may have a voltage withstanding property lower than that of the conventional switching power supply circuit and may have a smaller size, lower weight and superior characteristics compared to that of the conventional switching power supply circuit.

Thus, the present switching power supply circuit (which may include a voltage resonance converter) may have a relatively small size and weight, may provide a relatively high power conversion efficiency and improved characteristics such as a load power characteristic as compared to the conventional switching power supply circuit.

Other objects, features and advantages according to the present invention will become apparent from the following detailed description of illustrated embodiments when read in connection with the accompanying drawings in which corresponding components are identified by the same reference numerals.

BRIEF DESCRIPTION OF THE DRAWING

FIGS. 3a to 3l are waveform diagrams to which reference will be made in explaining the operation of the power supply circuit of FIG. 1;

FIGS. 15a to 15c are waveform diagrams.

DESCRIPTION OF THE PREFERRED EMBODIMENTS

Figure 1:
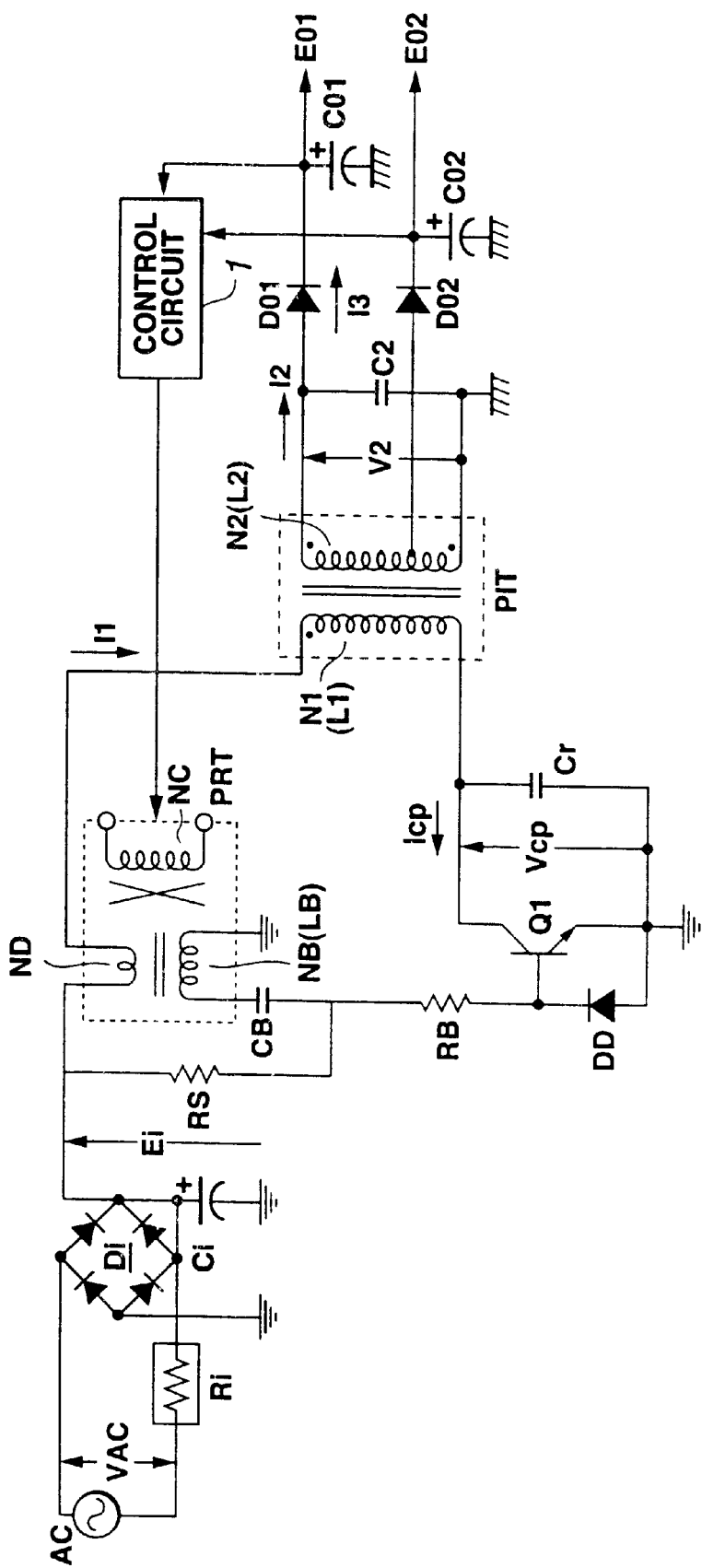
FIG. 1 is a diagram of a power supply circuit according to an embodiment of the present invention.

FIG. 1 illustrates a switching power supply circuit according to an embodiment of the present invention. Such power supply circuit includes a number of components similar to those of the power supply circuits previously described with reference to FIGS. 11 and 12. Further, the power supply circuit of FIG. 1 includes a switching converter of the voltage resonance type having a switching element (bipolar transistor) on the primary side similar to that in the power supply circuits of FIGS. 11 and 12. As is to be appreciated, the similar components may operate or perform in a manner substantially similar to that previously described and, in the interest of brevity, a further description of such similar components is omitted herein.

In the power supply circuit of FIG. 1, a fall-wave rectifier circuit composed of a bridge rectifier circuit Di and a smoothing capacitor Ci may be provided as a rectifier smoothing circuit which receives an ac input voltage VAC and produces a dc input voltage Ei therefrom. The rectified smoothed voltage Ei may have a level equal to that of the ac input voltage VAC. In other words, the power supply circuit of FIG. 1 does not include a voltage multiplying rectifier circuit as is in the power supply circuits of FIGS. 11 and 12. (In the present specification, a full-wave rectifier circuit which produces a rectified smoothed voltage Ei equal to the level of the ac input voltage VAC is referred to as an "equal voltage rectifier circuit".)

Figure 11:
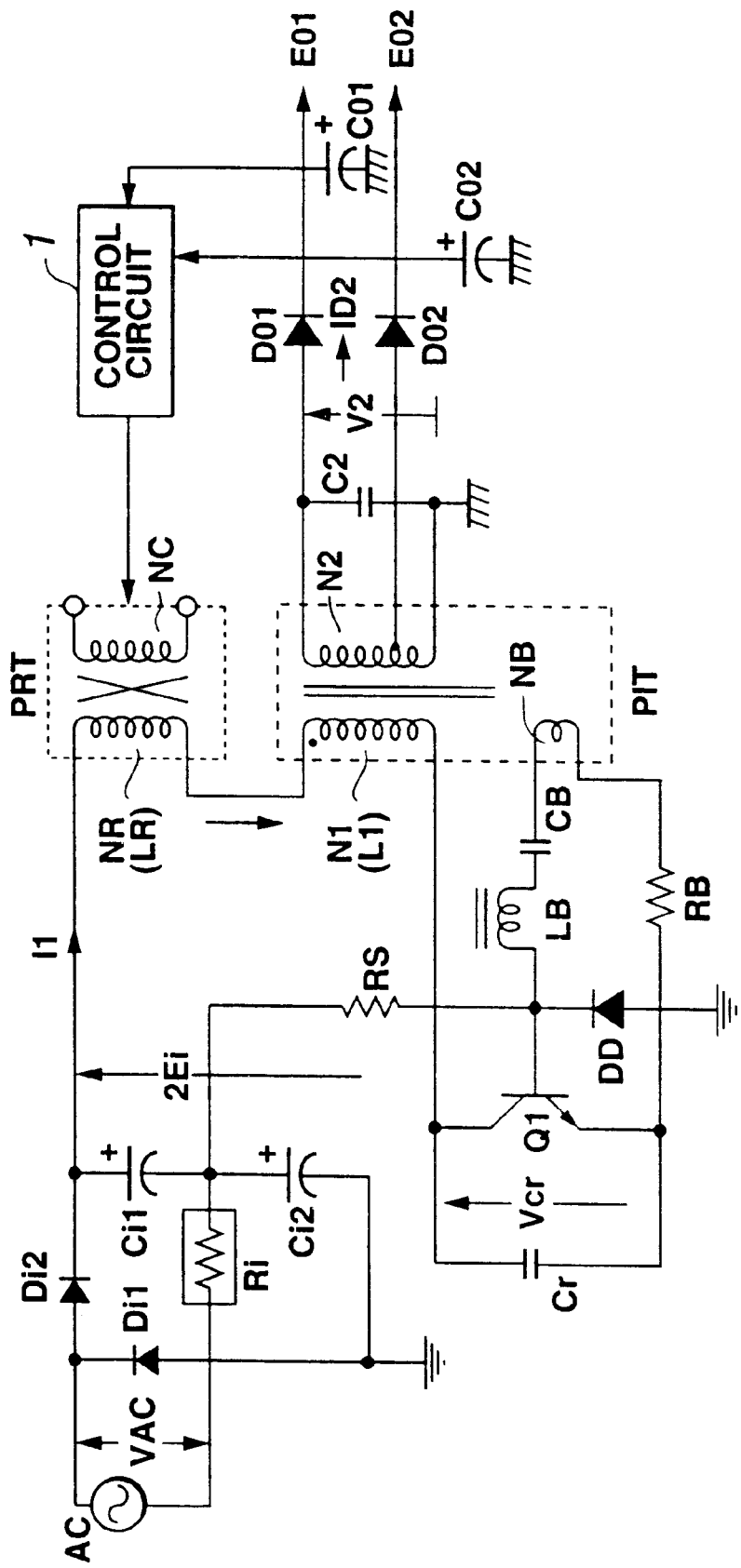
FIGS. 11 and 12 are circuit diagrams of power supply circuits.
Figure 12:
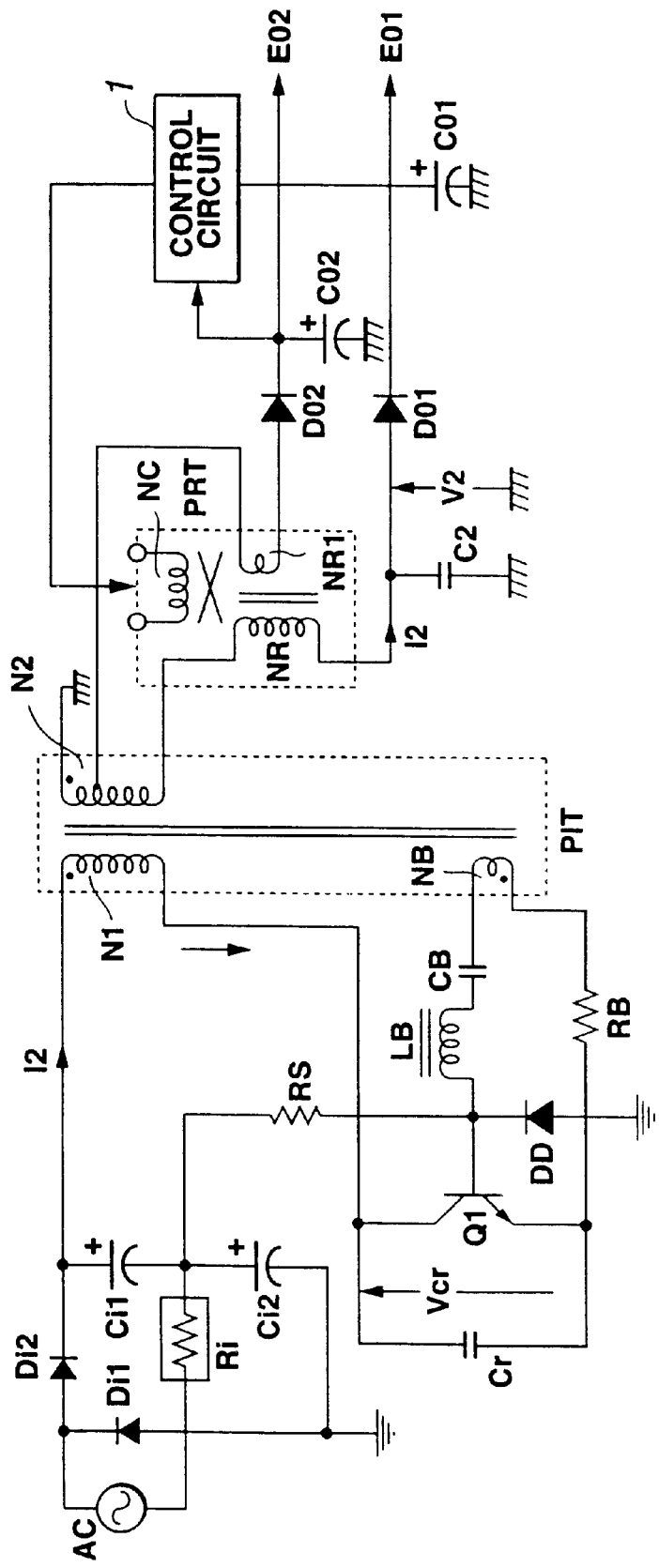
Figure 13:
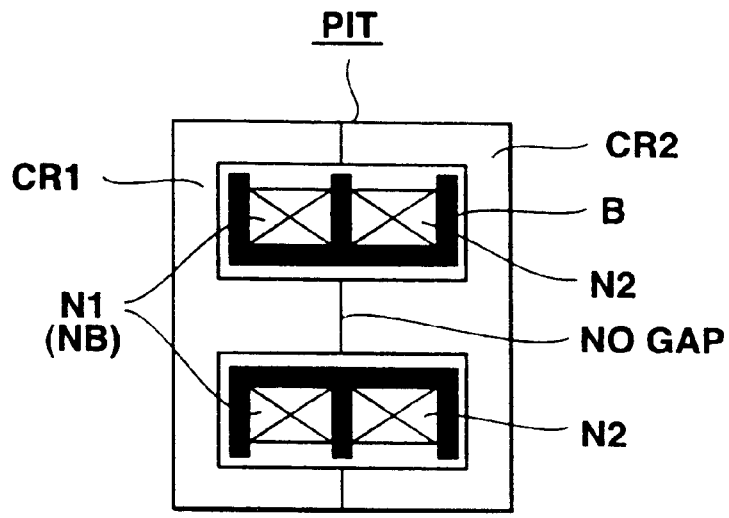
FIG. 13 is a sectional view of an insulating converter transformer which can be used in the power supply circuit of FIG. 11 or 12.

The voltage resonance converter of FIG. 1 includes a self-excited oscillation drive circuit for the switching element Q1 similar to the power supply circuits of FIGS. 11 and 12. However, such self-excited oscillation drive circuit of FIG. 1 includes a base current limiting resistor RB, a capacitor CB for resonance and a driving winding NB inserted between the base of the switching element Q1 and the primary side ground in a manner different from those of the power supply circuits of FIGS. 11 and 12.

The switching power supply circuit of FIG. 1 further includes an orthogonal control transformer PRT as a saturable reactor having a detection winding ND, a driving winding NB and a control winding NC wound thereon. The orthogonal control transformer PRT is adapted for driving the switching element Q1 and for performing constant voltage control.

The transformer PRT may have a three-dimensional core formed such that two double channel-shaped cores each having four magnetic legs are joined to each other at the ends of the magnetic legs thereof. The detection winding ND and the driving winding NB are wound in the same winding direction around two predetermined ones of the magnetic legs of the three-dimensional core, and the control winding NC is wound in a direction orthogonal to that of the detection winding ND and the driving winding NB. The detection winding ND may be arranged in series between the positive electrode of the smoothing capacitor Ci and a primary winding N1 of an insulating converter transformer PIT so that the switching output of the switching element Q1 is transmitted to the detection winding ND through the primary winding N1. The driving winding NB may be excited through transfer coupling by the switching output obtained at the detection winding ND so that an alternating voltage may be generated as a drive voltage in the driving winding NB. As a result, a drive current may be supplied through the base current limiting resistor RB to the base of the switching element Q1 from a dc resonance circuit formed of winding NB and capacitor CB (which forms the self-excited oscillation drive circuit). Consequently, the switching element Q1 may perform a switching operation with a switching frequency dependent upon the resonance frequency of the dc resonance circuit (NB and CB).

In the power supply circuit having the transformer PRT described above, an inductance component of a controlled winding may not be connected in series to either the primary winding N1 or the secondary winding N2. Although the primary winding N1 and the detection winding ND may be connected in series, since the number of turns of the detection winding ND is relatively small, the inductance of the detection winding ND is relatively low with respect to the leakage inductance of the insulating converter transformer PIT and, as such, the influence of the inductance of the detection winding ND upon the leakage inductance of the insulating converter transformer PIT can be almost ignored.

Figure 2:
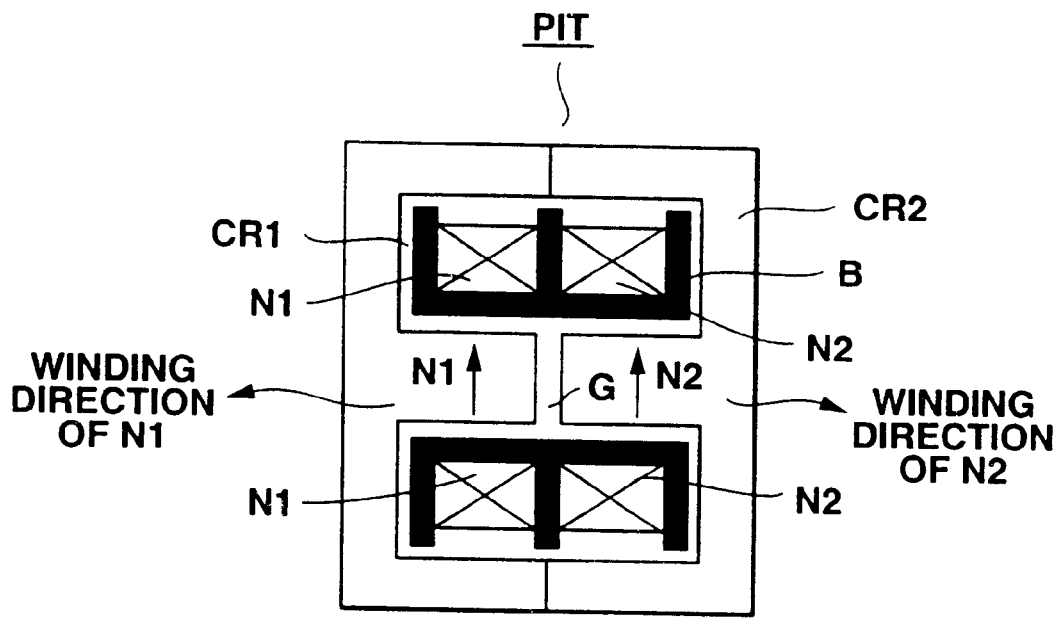
FIG. 2 is a sectional view of an insulating converter transformer provided in the power supply circuit of FIG. 1.

FIG. 2 illustrates the insulating converter transformer PIT provided in the power supply circuit of FIG. 1. As shown therein, the transformer PIT may include an EE-shaped core having a pair of E-shaped cores CR1 and CR2 which may be made of a ferrite material or the like and combined to each other such that magnetic legs thereof are opposed to each other. The primary winding N1 and the secondary winding N2 are wound separately from each other on the center or central magnetic legs of the EE-shaped core using a split bobbin B which has split winding portions for the primary side and the secondary side. Further, in the insulating converter transformer PIT, a gap G may be formed between the central magnetic legs of the EE-shaped core. Such gap G may be formed by having the central magnetic legs of the E-shaped cores CR1 and CR2 shorter than the outer two magnetic legs. Furthermore, the winding direction of the primary winding N1 and that of the secondary winding N2 of the insulating converter transformer PIT may be same as each other as indicated the arrows in FIG. 2.

As a result, the transformer PIT of FIG. 2 may have a loose coupling with a coupling coefficient lower than those of the insulating converter transformers PIT of FIGS. 11 and 12. Consequently, a saturation condition is less likely to be reached. The coupling coefficient k of the transformer PIT of FIG. 2 may have a value of approximately 0.78.

Figure 14A:
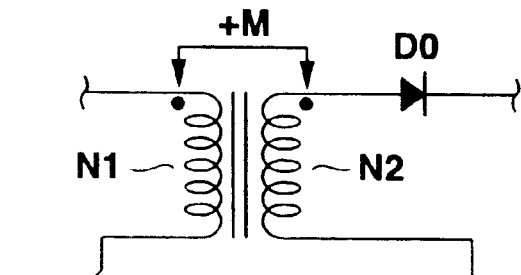
FIGS. 14a and 14b are diagrams of the insulating converter transformer of FIG. 13 when the mutual inductance is +M and -M, respectively.
Figure 14B:
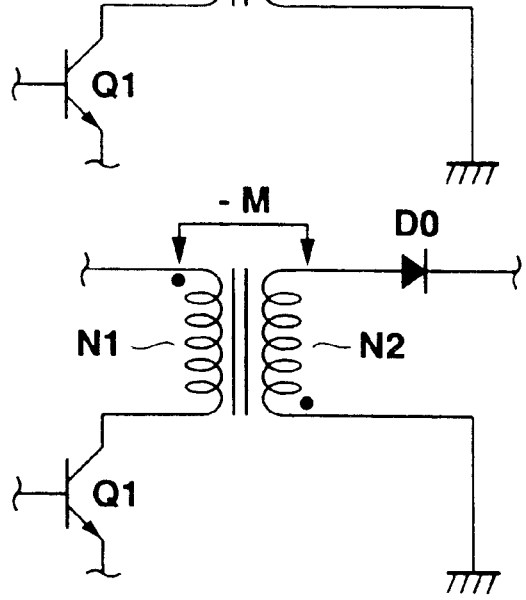

With regard to the secondary side of the power supply circuit of FIG. 1, such secondary side may be similar to that of the power supply circuit of FIG. 11. More particularly, on the secondary side, a secondary side parallel resonance circuit may be formed from the secondary winding N2 and the secondary side parallel resonance capacitor C2. In addition, half-wave rectifier circuits (which may be formed from capacitor C01 and rectifier diode D01, and capacitor C02 and rectifier diode D02) may be provided on the secondary side so as to obtain secondary side dc voltages E01 and E02. Here, an additive mode (+M; forward operation) rectification operation similar to that described with reference to FIG. 14A may be obtained.

A constant voltage control operation which may be performed by the power supply circuit having the orthogonal control transformer PRT described above with reference to FIG. 1 will now be described.

A control circuit 1 may vary the level of a control current (dc current) supplied to the control winding NC in response to a variation of the secondary side dc output voltage level (E01) to variably control the inductance LB of the driving winding NB wound on the orthogonal control transformer PRT. As a result, the resonance condition of the series resonance circuit in the self-excited oscillation drive circuit for the switching element Q1 which may include the inductance LB of the driving winding NB may be affected. As such, the switching frequency of the switching element Q1 may vary as hereinafter described with reference to FIGS. 3A to 3L. Such operation may stabilize the secondary side dc output voltage.

With regard to the switching frequency control, when the secondary side output voltage rises as a result of a load decrease or other change, the switching frequency may be raised so as to effect control for suppressing the secondary side output.

The power supply circuit of FIG. 1 may be formed as a composite resonance switching converter wherein a resonance circuit for making a switching operation an operation of the voltage resonance type is provided on the primary side and a resonance circuit for obtaining a voltage multiplying full-wave rectification operation is provided on the secondary side. Additionally, for constant voltage control, the power supply circuit may have a "self-excited oscillation switching frequency control" system wherein the switching frequency of self-excited oscillation is variably controlled. Further, the power supply circuit may operate such that, when it varies the switching frequency, it variably controls the period TON within which the switching element Q1 is on, whereas it keeps fixed the period TOFF within which the switching element Q1 is off. Such power supply circuit may be considered as performing a constant voltage control operation to variably control the switching frequency to perform resonance impedance control for the switching output, and simultaneously performing continuity angle control (PWM control) of the switching element in a switching period. This composite control operation is performed with a single control circuit system.

In the power supply circuit of FIG. 1, the ferrite EE type core of the insulating converter transformer PIT may be an EE 35 type core. Further, the gap G of the transformer PIT may have a value of approximately 1 mm with a resulting coupling coefficient of approximately 0.78. Furthermore, the primary winding N1 and the secondary winding secondary winding N2 of the transformer PIT may be 43 T and 38 T, respectively. Additionally, with regard to leakage inductances of the transformer PIT, the inductance L1 of the primary winding N1 side and the inductance L2 of the secondary winding N2 may have values of 130 $\mu$AH and 100 $\mu$H, respectively. Further, the resonance capacitor Cr on the primary side and the secondary side parallel resonance capacitor C2 may have values of 5,600 pF and 0.022 $\mu$F, respectively.

FIGS. 3A to 3L are waveform diagrams relating to operations of the power supply circuit of FIG. 1. More particularly, FIGS. 3A to 3F show operation waveforms at different portions of the power supply circuit when the ac input voltage VAC is 80 V and the load power is a maximum load power Pomax of 270 W, and FIGS. 3G to 3L show operation waveforms of the same portions when the ac input voltage VAC is 144 V and the load power is a minimum load power Pomin of 0 W.

The operation illustrated in FIGS. 3A to 3F will now be described.

The period TOFF within which the switching element Q1 is off is approximately 3 $\mu$s and the period TON within which the switching element Q1 is on is approximately 8.1 $\mu$s, and the switching frequency is approximately 100 KHz. Here, the resonance voltage Vcp (FIG. 3A) across the parallel circuit of the switching element Q1 and the-primary side resonance capacitor Cr may be generated when the switching element Q1 is off as the primary side resonance circuit acts upon the rectified smoothed voltage Ei. In the present power supply circuit, since the rectified smoothed voltage Ei is approximately ½ that obtained upon voltage multiplying rectification as described above, the resonance voltage Vcp may be suppressed to approximately 700 V in peak value whereas the resonance voltage Vcr generated in the power supply circuit of FIG. 11 is approximately 1,800 V. Accordingly, in the power supply circuit of FIG. 1, a device having a voltage withstanding property against approximately 800 V may be selected for the switching element Q1 and the resonance capacitor Cr.

Upon turning on the switching element Q1, damper current may flow through a clamp diode DD and the base-collector of the switching element Q1 to the primary winding N1. After the end of a damper period wherein the flow of the damper current ceases, collector current Icp of the switching element Q1 first exhibits a sudden level rise toward a positive level from a negative level and then exhibits a moderate drop as shown in FIG. 3C. At such time, the waveform of the collector current Icp within the period TON has a rightwardly decreasing slope. As a result, each of the primary side resonance current I1 flowing through the primary winding N1 and the secondary side resonance current I2 flowing through the secondary winding N2 exhibits a sudden level change to a negative level once within the period TOFF and then exhibits a rise to a positive level during a period which substantially corresponds to the damper period. Afterwards, the current I1 and the current I2 exhibit a decrease as shown respectively by the waveforms of FIGS. 3B and 3D. As shown therein, at such time, the waveforms have a rightwardly decreasing slope within the period TON.

As shown in FIGS. 3B and 3D, primary side resonance current I1 and secondary side resonance current I2 have high levels for a relatively long portion of the period TON. As a result, the power supply circuit of FIG. 1 may increase the available load power as compared to a conventional power supply circuit.

The above operation and feature of the present power supply circuit may be due to the gap G formed between the middle magnetic legs of the insulating converter transformer PIT which provides a loose coupling condition as described hereinabove with reference to FIG. 2.

With regard to the operation of the secondary side, the secondary side resonance voltage V2 across the secondary winding N2 and the secondary side parallel resonance capacitor C2 is shown in FIG. 3F, and the rectified current I3 flowing through the rectifier diode D01 is shown in FIG. 3E. As seen from the waveforms of FIGS. 3E and 3F, the secondary side resonance voltage V2 has a negative polarity resonance pulse waveform in the form of a sine wave within a period DOFF wherein the rectifier diode D01 is off, and rectified current flows through the rectifier diode D01 and the secondary side resonance voltage V2 then has a waveform clamped with a level equal to the dc output voltage (E0) within a period DON wherein the rectifier diode D01 is on. The waveforms of FIGS. 3E and 3F provide an indication of a half-wave rectification operation for a resonance voltage generated on the secondary side.

On the other hand, when the ac input voltage VAC is 144 V and the load power is the minimum load power as illustrated in FIGS. 3G to 3L, the switching frequency may be raised as seen from the waveform of the resonance voltage Vcp on the primary side shown in FIG. 3G. Further, when the switching frequency is varied, the period TOFF may be fixed while the period TON (continuity angle of the switching element Q1) may be varied as described hereinabove. As a result, the period TON may become shorter. As an example, the period TOFF and the period TON may each have a value of substantially 3 μs, and the switching frequency may be approximately 170 KHz.

In other words, in the power supply circuit of FIG. 1, the switching frequency may be variably controlled within the range of approximately 100 KHz to 170 KHz in response to a load power variation. Thus, as compared to the circuits of FIGS. 11 and 12 wherein the switching frequency may be fixed to approximately 50 KHz, a higher switching frequency may be obtained with the present circuit of FIG. 1.

As shown in FIG. 3I, the collector current Icp may exhibit a waveform corresponding to the operation in which damper current flows within the former half of the period TON and then the collector current Icp flows in a direction from the collector to the emitter within the latter half of the period TON. Further, the primary side resonance current I1 and the secondary side resonance current I2 may exhibit waveforms of sine waves corresponding to a switching period as shown in FIGS. 3H and 3J, respectively. Also, the secondary side resonance voltage V2 may have a waveform of a sine wave corresponding to the secondary side resonance current I2.

As the switching frequency is raised to decrease the continuity angle (period TON) of the switching element Q1, the rectifier diode D01 of the secondary side may perform a rectification operation such that the rectified current I3 is fixed within the period DOFF wherein the switching element Q1 is off and the period DON wherein the switching element Q1 is on is shortened, as shown in FIG. 3K. As a result of such operation waveform of the rectified current I3, the constant voltage control range may be significantly expanded.

Figure 4:
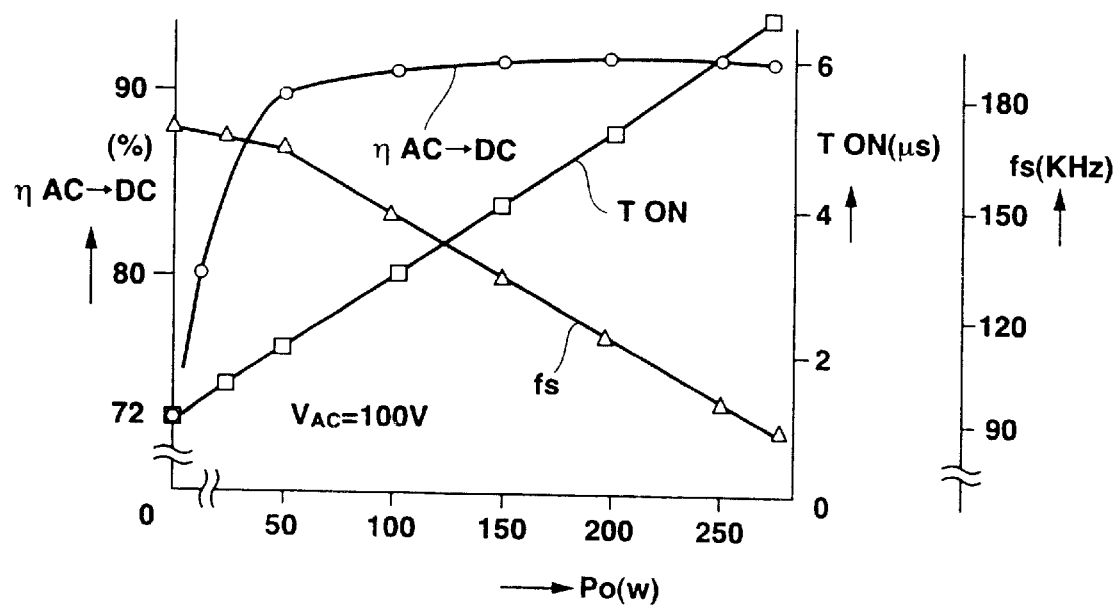
FIGS. 4 and 5 are diagrams of operation characteristics of the power supply circuit of FIG. 1.

When the ac input voltage VAC is 100 V and the load power ranges from Pomin=0 W to Pomax=270 W, the power supply circuit of FIG. 1 may have a power conversion efficiency characteristic and switching frequency fs and period TON characteristics of the switching element Q1 with respect to load power variation as illustrated in FIG. 4. As seen from the characteristics of FIG. 4, as the load power increases from minimum load power Pomin=0 W to the maximum load power Pomax=270 W, the switching frequency fs may drop from approximately 170 KHz to approximately 90 KHz and the period TON wherein the switching element Q1 is on may increase. This corresponds to the operation described hereinabove with reference to FIG. 3.

Figure 5:
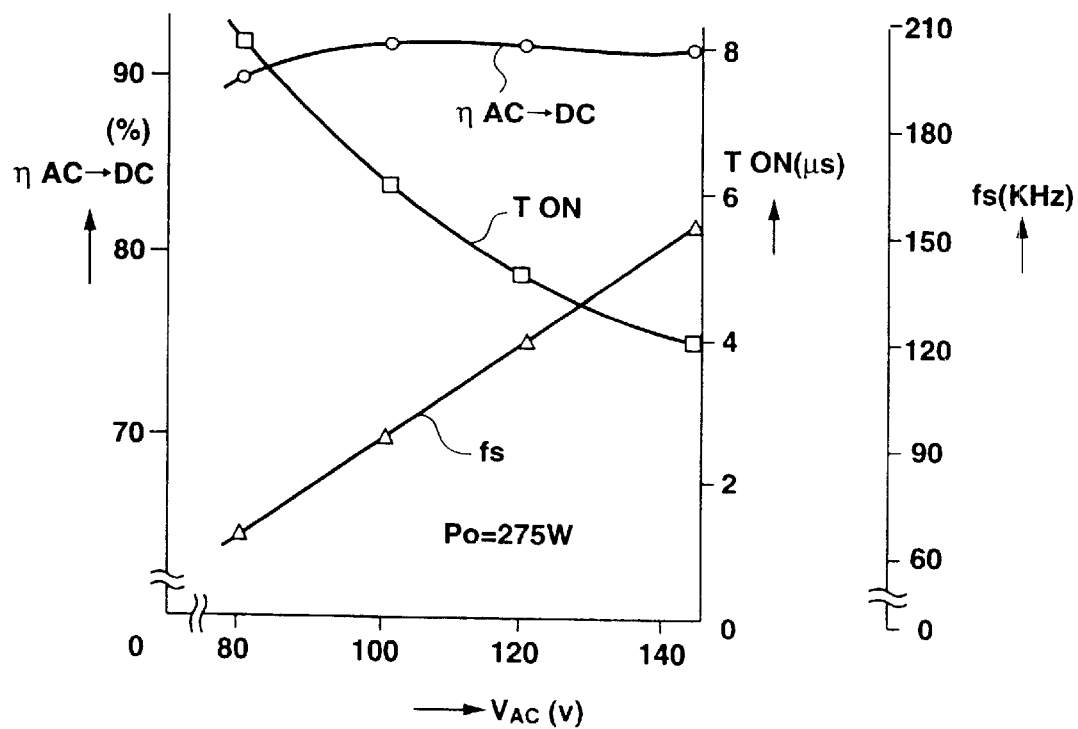

When the load power is in the maximum Pomax=275 W and the ac input voltage VAC ranges from 80 V to 144 V, the power supply circuit of FIG. 1 may have a power conversion efficiency characteristic and switching frequency fs and period TON characteristics of the switching element Q1 with respect to the ac input voltage VAC as illustrated in FIG. 5. As seen from FIG. 5, as the ac input voltage VAC rises from 80 V to 144 V, the switching frequency fs may rise from approximately 60 KHz to approximately 150 KHz and the period TON wherein the switching element Q1 is on may decrease.

Further, as seen from FIGS. 4 and 5, the power supply circuit of FIG. 1 may have a power conversion efficiency of approximately 92%. Such power conversion efficiency is substantially higher than that of the power supply circuit of FIG. 11 which has a power conversion efficiency of approximately 84%. This may result from the control of the switching frequency within a high variation range of approximately 100 KHz or more due to the construction of the orthogonal control transformer PRT described above with reference to FIG. 1.

The power supply circuit described of FIG. 1 may be modified as hereinbelow described.

Figure 8:
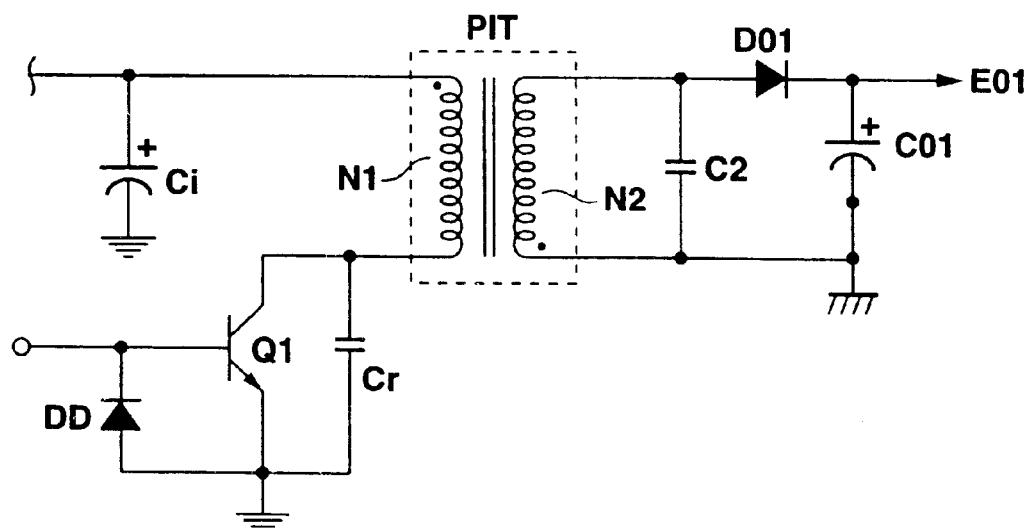
FIGS. 8 and 9 are diagrams illustrating modifications to the power supply circuit of FIG. 1.

The modified power supply circuit may adopt a switching frequency control system of the self-excited oscillation type and may be formed as a composite resonance converter which includes a voltage resonance converter on the primary side. The insulating converter transformer PIT may be constructed at the primary side and the secondary side as shown in FIG. 8. (It is to be noted that, in FIG. 8, only the smoothing capacitor Ci, switching element Q1, primary side resonance circuit (N1 and Cr), insulating converter transformer PIT, secondary side resonance circuit (N2 and C2) and secondary side half-wave rectifier circuit (D01 and C01) for producing the dc output voltage E01 are shown.) On the secondary side, half-wave rectification may be performed by a forward mode operation.

Figure 6:
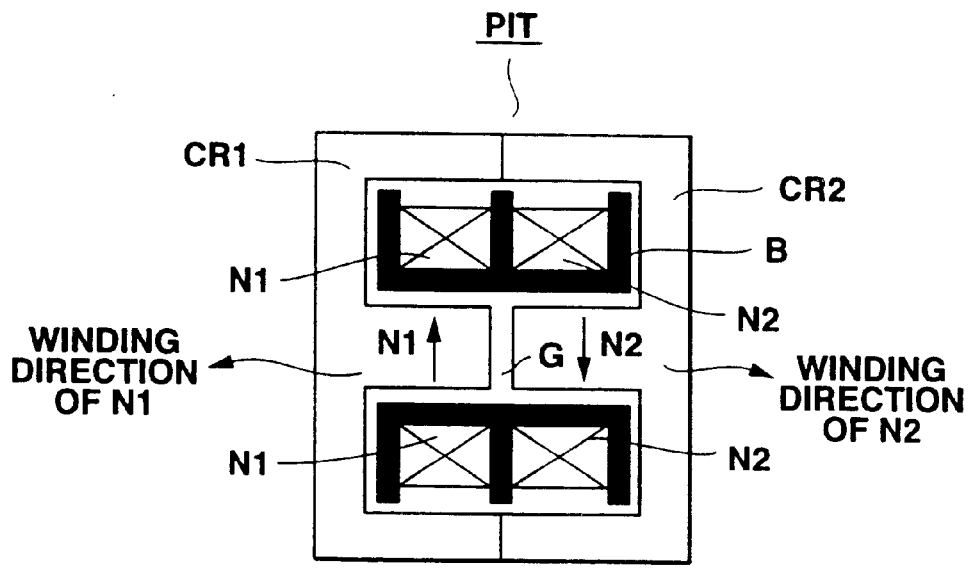
FIG. 6 is a sectional view of another insulating converter transformer which may be provided in the power supply circuit of FIG. 1.
Figure 7:
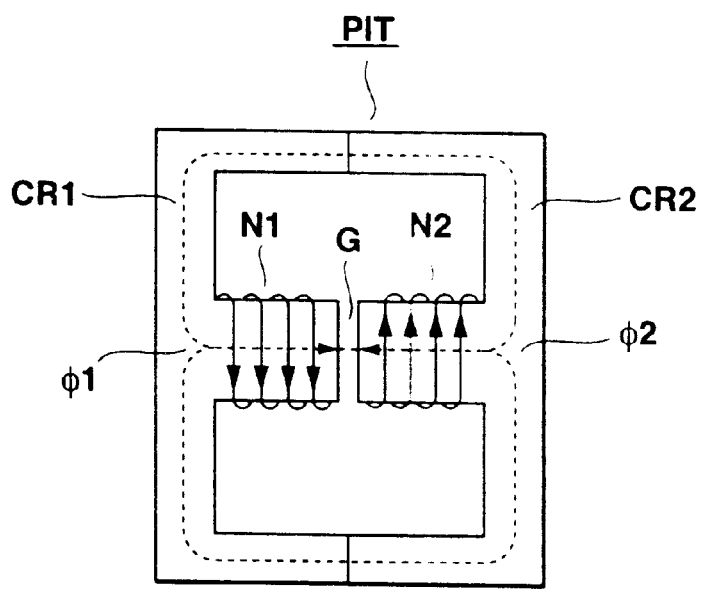
FIG. 7 is a diagram illustrating a magnetic flux characteristic of the insulating converter transformer of FIG. 6.

In the modified power supply circuit of FIG. 8, the insulating converter transformer PIT may have a core structure similar to that described above with reference to FIG. 2 with the exception of the winding directions. That is, the winding direction of the primary winding N1 and winding direction of the secondary winding N2 wound on the insulating converter transformer PIT are opposite to each other as shown in FIG. 6. In such insulating converter transformer PIT, as shown in FIG. 7, magnetic flux φ1 generated by primary side resonance current flowing through the primary winding Ni and magnetic flux φ2 generated by secondary side resonance current flowing through the secondary winding N2 act to cancel each other. On the other hand, when the winding directions of the primary winding N1 and the secondary winding N2 are the same as in the arrangement of FIG. 2, the magnetic flux φ1 and the magnetic flux φ2 may act so as to be added together.

When the magnetic flux φ1 and magnetic flux φ2 act to cancel each other as in the modified power supply circuit, the magnetic flux density of the ferrite core which forms the insulating converter transformer PIT is lower than that when the magnetic flux φ1 and the magnetic flux φ2 are added together. This may result in a reduction of iron loss of the ferrite core. For example, in the power supply circuit of FIG. 8 having the insulating converter transformer PIT of FIG. 6, a reduction of power loss by approximately 1.5 W with respect to the maximum load power Pomax =270 W may be achieved.

The operation of the above-described modified power supply circuit may be similar to that described with reference to the waveform diagrams of FIGS. 3A to 3L.

Figure 9:
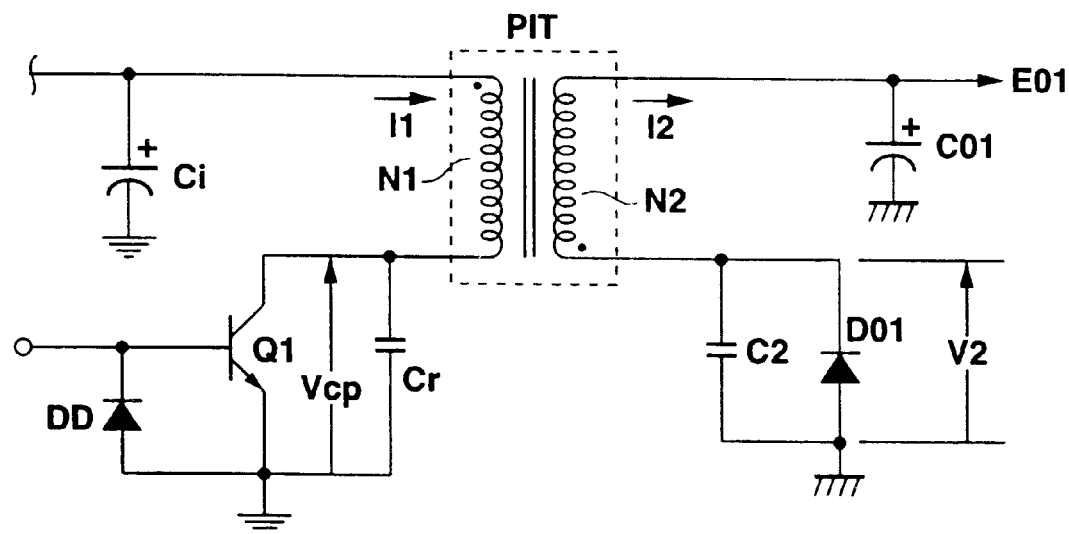

FIG. 9 shows another modification to the power supply circuit of FIG. 1. In FIG. 9, elements similar to those of FIGS. 1 and 8 are denoted by the same reference characters. Such elements of FIG. 9 may operate and function in a manner similar to that previously described with reference to FIGS. 1 and 8 and, as such, a further description thereof is omitted herein.

The modified power supply circuit of FIG. 9 may have a construction similar to that of FIG. 1 and may have an insulating converter transformer PIT similar to that of FIG. 6. However, the present modified power supply circuit of FIG. 9 is different from the modified power supply circuit of FIG. 8 with regard to the construction of a half-wave rectifier circuit of the secondary side. In the modified power supply circuit of FIG. 9, the positive terminal of the smoothing capacitor C01 is connected to an end of the secondary winding N2 and the other end of the secondary winding N2 is grounded to the secondary side ground through the rectifier diode D01. The anode of the rectifier diode D01 is connected to the secondary side ground and the cathode thereof is connected to the secondary winding N2. Further, the parallel resonance capacitor C2 is connected in parallel to the rectifier diode D01. Also, a secondary side parallel resonance circuit may be formed from the parallel resonance capacitor C2 and a leakage inductance component of the secondary winding N2.

The modified power supply circuit of FIG. 9 may achieve a reduction in the power loss since the iron loss by the ferrite core may be decreased similarly to that of the modified power supply circuit of FIG. 8.

Figure 10:
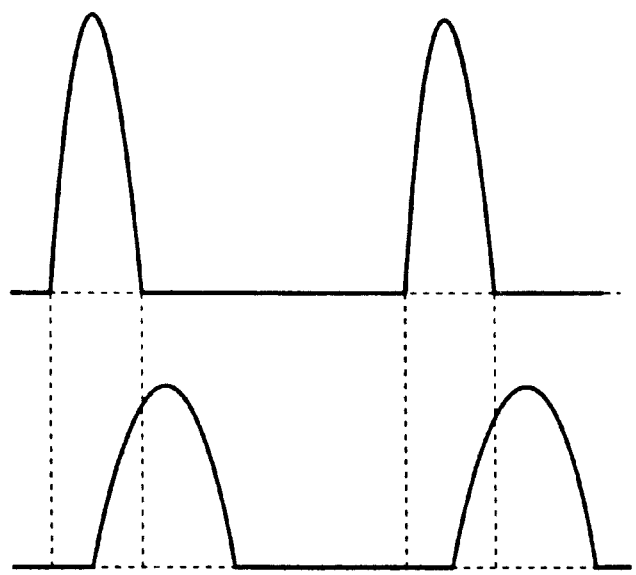
FIGS. 10a and 10b are waveform diagrams pertaining to an operation of the modified power supply circuit of FIG. 9.

With regard to the operation of the modified power supply circuit of FIG. 9, a waveform diagram of the resonance voltage Vcp of the primary side is shown in FIG. 10A and a waveform diagram of the secondary side resonance voltage V2 is shown in FIG 10B. Since the half-wave rectifier circuit of the secondary side is formed as described above with reference to FIG. 9, the secondary side resonance voltage V2 shown in FIG. 10B is different from the waveform shown in FIG. 3F.

Although the power supply circuits of FIGS. 1, 8 and 9 have a construction such that a self-excited voltage resonance converter may be provided on the primary side, they are not limited thereto and may have an alternative construction such that, for example, an oscillation and drive circuit in the form of an integrated circuit (IC) is provided in place of the self-excited oscillation drive circuit which drives the switching element of the voltage resonance converter.

In this instance, as constant voltage control, the drive signal waveform produced by the oscillation and drive circuit is variably controlled in response to the secondary side output voltage level. For such control, the produced drive signal waveform may be such that the period TOFF wherein the switching element is off is fixed and the period TON wherein the switching element is on is decreased as the secondary side output voltage level rises so as to correspond to the switching frequency control (continuity angle variation) operation previously described with reference to FIGS. 3A to 3L. By such control, the power supply circuit can operate in a manner similar to that described with reference to FIG. 5.

When a separately excited construction as just described is adopted, the orthogonal control transformer PRT may be omitted.

Further, when the above-described separately excited construction is adopted, in place of the switching element Q1 in the form of a single bipolar transistor (BJT), a Darlington circuit wherein two bipolar transistors (BJT) are connected in a Darlington connection may be utilized. Also in place of the switching element Q1 in the form of a single bipolar transistor (BJT), a MOS-FET (MOS field effect transistor; metal oxide semiconductor), IGBT (insulated gate bipolar transistor) or a SIT (electrostatic induction thyristor) and the like may be utilized. When the Darlington circuit or one of these other devices is used as the switching element, a further high efficiency may be achieved. Further, when any of these devices is used as the switching element, the construction of a drive circuit for the switching element may be modified so as to satisfy a characteristic of the respective device used in place of the switching element Q1. For example, if a MOS-FET is used as the switching element, then the drive circuit for the switching element may be constructed so as to drive the switching element in a separately excited manner as described hereinabove.

Although a preferred embodiment of the present invention and modifications thereof have been described in detail herein, it is to be understood that this invention is not limited to this embodiment and modifications, and that other modifications and variations may be effected by one skilled in the art without departing from the spirit and scope of the invention as defined by the appended claims.

What is claimed is:

1. A switching power supply circuit, comprising:

rectifier smoothing means for receiving an ac power supply, producing a rectified smoothed voltage having a level equal to that of the ac power supply and outputting the rectified smoothed voltage as a dc input voltage;

an insulating converter transformer for transmitting a primary side output to a secondary side, said insulating converter transformer having a gap formed therein so that a coupling efficient (k) for a loose coupling is obtained;

switching means including a switching element for switching the dc input voltage on and off so as to be outputted to a primary winding of said insulating converter transformer;

a primary side resonance circuit formed from a leakage inductance component from said primary winding of said insulating converter transformer and a capacitance of a resonance capacitor to enable said switching means to operate as a voltage resonance type;

a secondary side parallel resonance circuit including a secondary winding of said insulating converter transformer and a secondary side parallel resonance capacitor connected such that a parallel resonance circuit is formed from a leakage inductance component of said secondary winding of said insulating converter transformer and a capacitance of said secondary side parallel resonance capacitor;

dc output voltage production means for receiving an alternating voltage obtained at said secondary winding of said insulating converter transformer and performing a half-wave rectification operation by an additive mode for the alternating voltage to produce a secondary side dc output voltage; and constant voltage control means for varying a switching frequency of said switching element in response to a level of the secondary side dc output voltage to perform constant voltage control of the secondary side output voltage.

2. A switching power supply circuit according to claim 1, wherein said primary winding and said secondary winding of said insulating converter transformer are wound in the same winding direction.

3. A switching power supply circuit according to claim 1, wherein said primary winding and said secondary winding of said insulating converter transformer are wound in opposite directions.

4. A switching power supply circuit according to claim 1, wherein insulating converter transformers includes two E-shaped cores each having outer and center legs in which said gap is the distance between the center legs of the two E-shaped cores.

5. A switching power supply circuit according to claim 4, wherein said gap is approximately 1 mm.

6. A switching power supply circuit according to claim 1, wherein said coupling coefficient k has a value of approximately 0.78.

7. A switching power supply circuit according to claim 1, wherein said constant voltage control means includes an orthogonal control transformer.

* * * * *